(12) United States Patent
Lii

(10) Patent No.: US 7,742,038 B2
(45) Date of Patent: Jun. 22, 2010

(54) METHOD FOR DETECTING OVERLAPPED FUNCTION AREA ON A TOUCHPAD

(75) Inventor: Jia-Yih Lii, Taichung (TW)

(73) Assignee: Elan Microelectronics Corporation, Hsinchu (TW)

( * ) Notice: Subject to any disclaimer, the term of this patent is extended or adjusted under 35 U.S.C. 154(b) by 1173 days.

(21) Appl. No.: 11/305,390

(22) Filed: Dec. 19, 2005

(65) Prior Publication Data

US 2006/0290679 A1 Dec. 28, 2006

(30) Foreign Application Priority Data

Jun. 23, 2005 (TW) .............................. 94121042 A

(51) Int. Cl.
*G09G 5/00* (2006.01)

(52) U.S. Cl. ...................... 345/156; 345/173; 715/786

(58) Field of Classification Search ................. 345/204, 345/156, 173; 715/786, 787, 790; 178/18.01, 178/18.03–18.09
See application file for complete search history.

(56) References Cited

U.S. PATENT DOCUMENTS

| | | | | |
|---|---|---|---|---|
| 4,790,028 A | * | 12/1988 | Ramage | 382/298 |
| 5,854,625 A | * | 12/1998 | Frisch et al. | 345/173 |
| 5,880,717 A | * | 3/1999 | Chan et al. | 345/173 |
| 6,259,436 B1 | * | 7/2001 | Moon et al. | 345/173 |
| 6,473,069 B1 | * | 10/2002 | Gerpheide | 345/157 |
| 2003/0206162 A1 | * | 11/2003 | Roberts | 345/173 |
| 2005/0134577 A1 | * | 6/2005 | Lin et al. | 345/173 |

* cited by examiner

*Primary Examiner*—Amare Mengistu
*Assistant Examiner*—Koosha Sharifi
(74) *Attorney, Agent, or Firm*—Rosenberg, Klein & Lee

(57) ABSTRACT

In a method for detecting overlapped function area on a touchpad with the overlapped function area overlapped by more than two different function areas, when the overlapped function area is touched by an object, a further function can be correctly performed according to touched duration, touched movement, or a terminal touched area pressed onto the touchpad.

1 Claim, 7 Drawing Sheets

METHOD FOR DETECTING OVERLAPPED FUNCTION AREA ON A TOUCHPAD

FIELD OF THE INVENTION

The present invention is generally related to a detection method for a touchpad and, more particularly, to a method for detecting overlapped function area on a touchpad.

BACKGROUND OF THE INVENTION

Touchpad is designed to be an input device. For performing all of its functions such as controlling the movement corresponding to a point, it can be touched or slipped by a finger or a conductive object. Owing to its easy operation, therefore, it is widely applied to electronic products, including portable computer, personal digital assistant (PDA), mobile phone, and etc.

Additionally, for supporting more functions on the limited space, of the touchpad space is improved to comprise more than two operation areas.

FIG. 1 is a diagram of a conventional touchpad 10 having four operation areas placed in the corners respectively. The four operation areas, CR1, CR2, CR3, and CR4, are referred to as "corner function areas", and generally, they are acted as suppositional function keys having their own corresponding functions. Hence, a related function can be performed when one of the corner function areas is touched by finger 12.

FIG. 2 is a diagram of a touchpad 20 having two scroll function areas. The scroll function areas, SCROLL1 and SCROLL2, have their own corresponding function of rolling scrolls on Window. Similar to the touchpad 10 of FIG. 1, a further function can be performed when the scroll function area SCROLL1 or SCROLL2 is slipped by the finger 12.

For more convenient operation, more function areas are individually programmed within the touchpad limited space. In further consideration, hence, some function areas must be reasonably overlapped together to save the usable space. However, an indefinite command mistake will be easily resulted without any detection methods of distinguishing the accurate commands from a user when the overlapped function area is touched.

FIG. 3 is a diagram of a touchpad 30 having corner function areas and scroll function areas. As shown in FIG. 3, the scroll area SCROLL1 overlaps the corner function areas CR1 and CR2, and the scroll area SCROLL2 overlaps the corner function areas CR2 and CR3. Conventionally, the corresponding functions are performed when the corresponding corner function areas thereto are touched. However, the touchpad is installed inside a case slot, and there exists a gap surrounding the touchpad, as shown in FIG. 4. Thus, when a user touches a corner function area and a finger is placed on the gap between the case and the touchpad, obviously, a function corresponding to the corner function area may be missed because of incomplete or soft touching input.

Otherwise, when the finger 12 touches the corner function area CR1 of the touchpad 30, for example, the touching angle of the finger 12 will be mistaken to be a movement pressed on the scroll area SCROLL1.

SUMMARY OF THE INVENTION

Accordingly, an object of the present invention is to provide a method of detecting overlapped function area of a touchpad. The overlapped function area is overlapped by more than two different function areas. When the overlapped function area is touched by an object, a further function can be correctly performed according to touched duration, touched movement, or a terminal touched area pressed onto the touchpad.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

The object of the present invention is to provide a method of detecting overlapped function area of a touchpad. The overlapped function area is overlapped by more than two different function areas. When the overlapped function area is touched by an object, a further function can be correctly performed according to touched duration, touched movement, or a terminal touched area pressed onto the touchpad.

Figure 2:
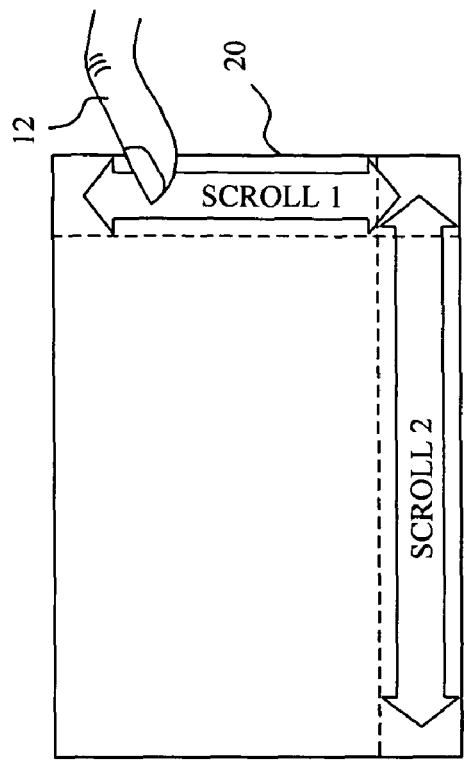
FIG. 2 is a diagram of a conventional touchpad having two scroll function areas.
Figure 1:
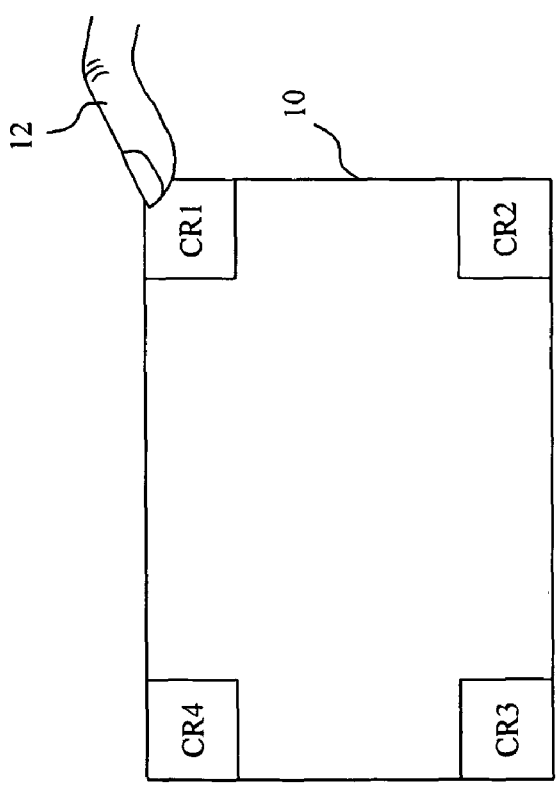
FIG. 1 is a diagram of a conventional touchpad having four corner function areas.
Figure 3:
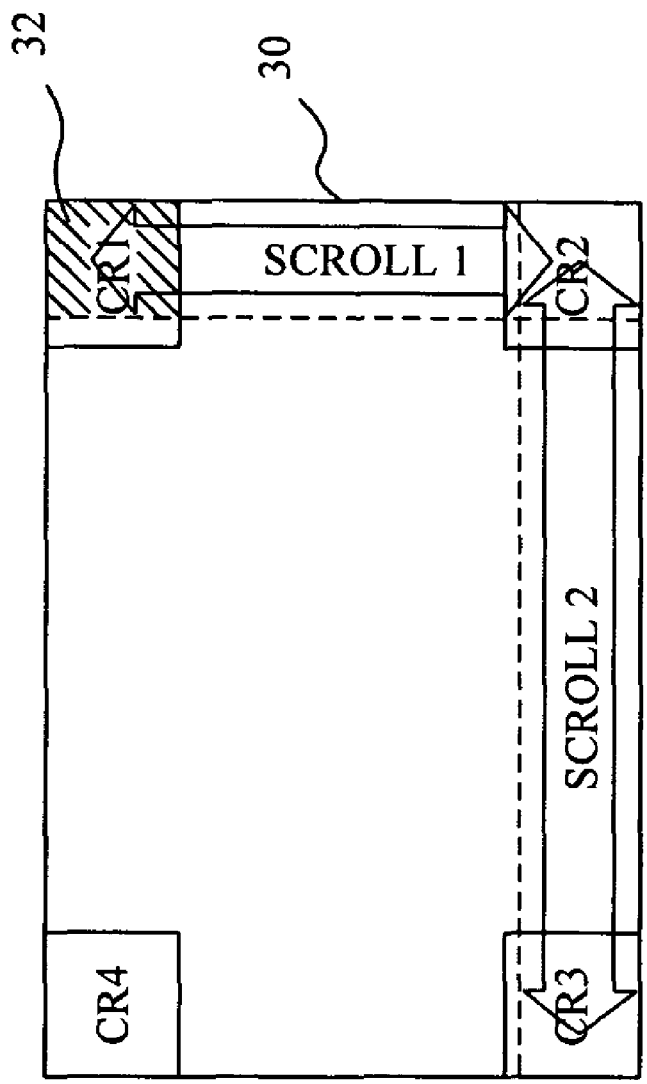
FIG. 3 is a diagram of a touchpad having both corner function areas and scroll function areas.
Figure 5:
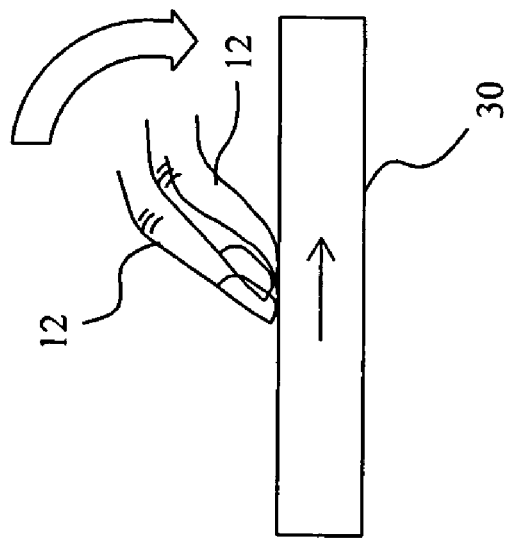
FIG. 5 is a diagram of a touchpad touched by a finger.
Figure 4:
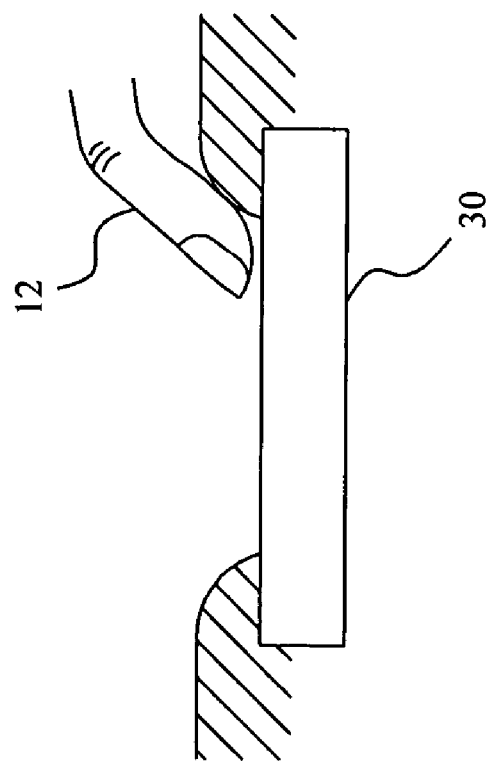
FIG. 4 is a diagram of a touchpad installed in a case slot.

Of the embodiments disclosed below, the touchpad which all detection methods of the present invention are operated with can be referred to as the touchpad 30 of FIG. 3, but it is not limited to the embodiments.

First Embodiment

Figure 6:
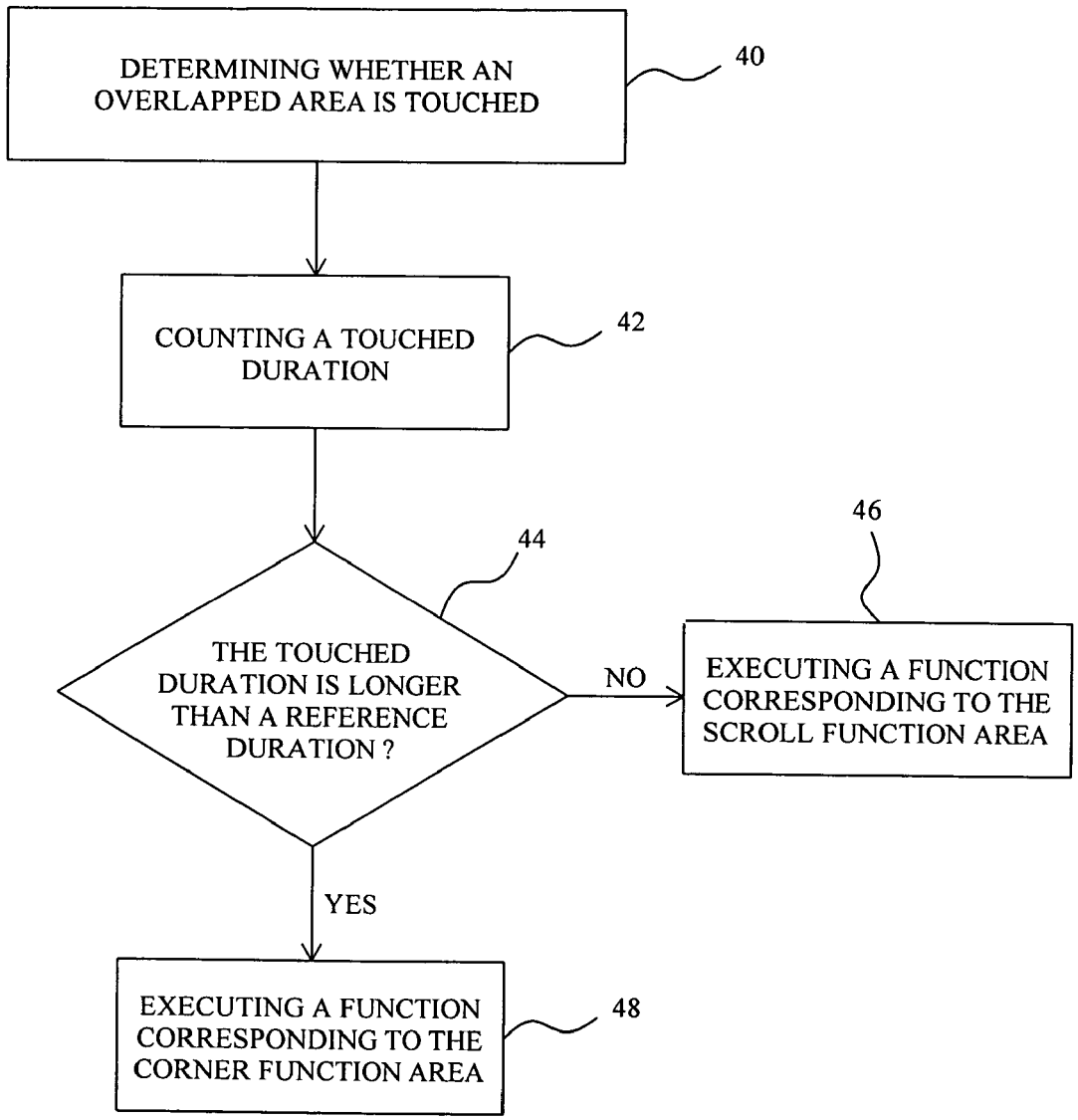
FIG. 6 is a flowchart of the first embodiment of the present invention.

FIG. 6 is a diagram of the first embodiment of the present invention. Step 40 first determines whether an overlapped area is touched; wherein the overlapped area, for example, is referred to as the overlapped area 32 in FIG. 3, which is overlapped by the corner function area CR1 and the scroll function area SCROLL1. If the result of step 40 is true, step 42 follows and counts a touched duration on the overlapped area, then step 44 follows and determines whether the touched duration is longer than a duration reference. If the result of step 44 is true, step 48 follows and performs a function corresponding to the corner function area CR1; whereas, step 46 follows and performs a function corresponding to the scroll function area SCROLL1.

Second Embodiment

Figure 7:
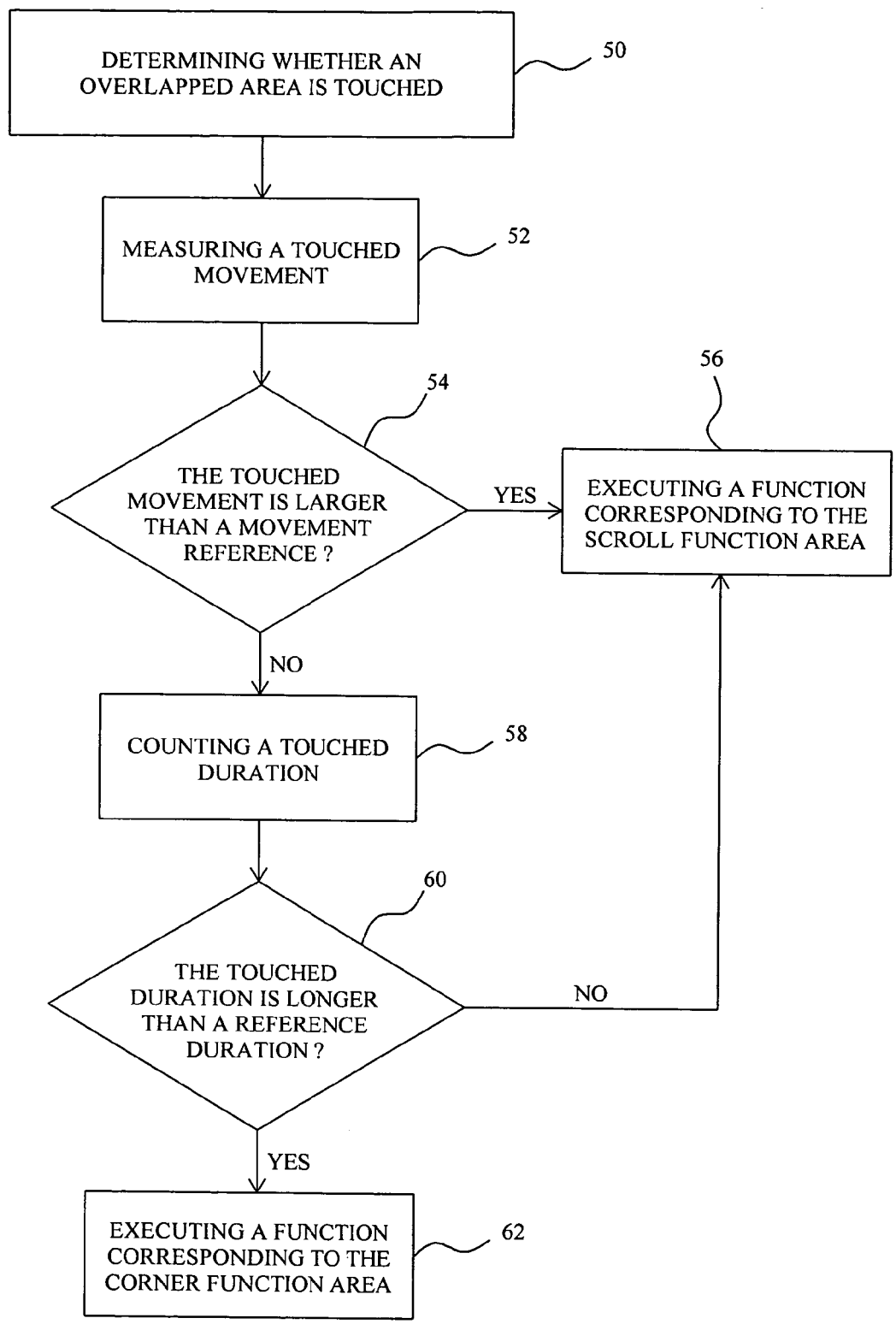
FIG. 7 is a flowchart of the second embodiment of the present invention.

FIG. 7 is a diagram of the second embodiment of the present invention. First, step 50 determines whether an overlapped area is touched; wherein the overlapped area, for example, is referred to as the overlapped area 32 in FIG. 3, which is overlapped by the corner function area CR1 and the scroll function area SCROLL1. If the result of the step 50 is true, step 52 follows and measures a touched movement. Step 54 then follows and determines whether the touched movement is larger than a movement reference. If the result of step 54 is true, step 56 follows and performs a function corresponding to the scroll function area SCROLL1; whereas, step 58 follows and counts a touched duration on the overlapped area. Step 60 follows and determines whether the touched duration is longer than a duration reference. If the result of step 60 is true, step 62 follows and performs a function corresponding to the corner function area CR1; whereas, the step is returned to step 56 and then performs a function corresponding to the scroll function area SCROLL1.

Third Embodiment

Figure 8:
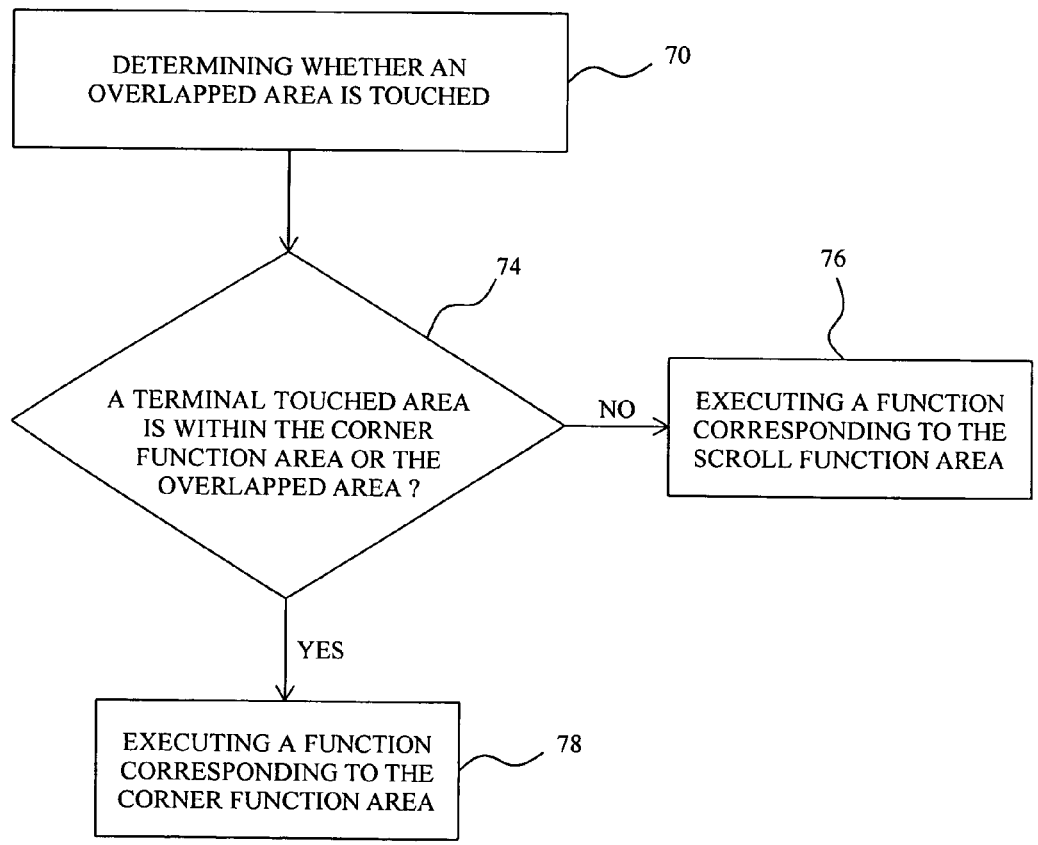
FIG. 8 is a flowchart of the third embodiment of the present invention.

FIG. 8 is a diagram of the third embodiment of the present invention. Step 70 first determines whether an overlapped area is touched; wherein the overlapped area, for example, is referred to as the overlapped area 32 in FIG. 3, which is overlapped by the corner function area CR1 and the scroll function area SCROLL1. Then, step 74 follows and determines whether a terminal touched area is within the corner function area CR1 or the overlapped area 32. If the result of step 74 is true, then step 78 follows and performs a function corresponding to the corner function area CR1; whereas, step 76 follows and performs a function corresponding to the scroll function area SCROLL1.

Fourth Embodiment

Figure 9:
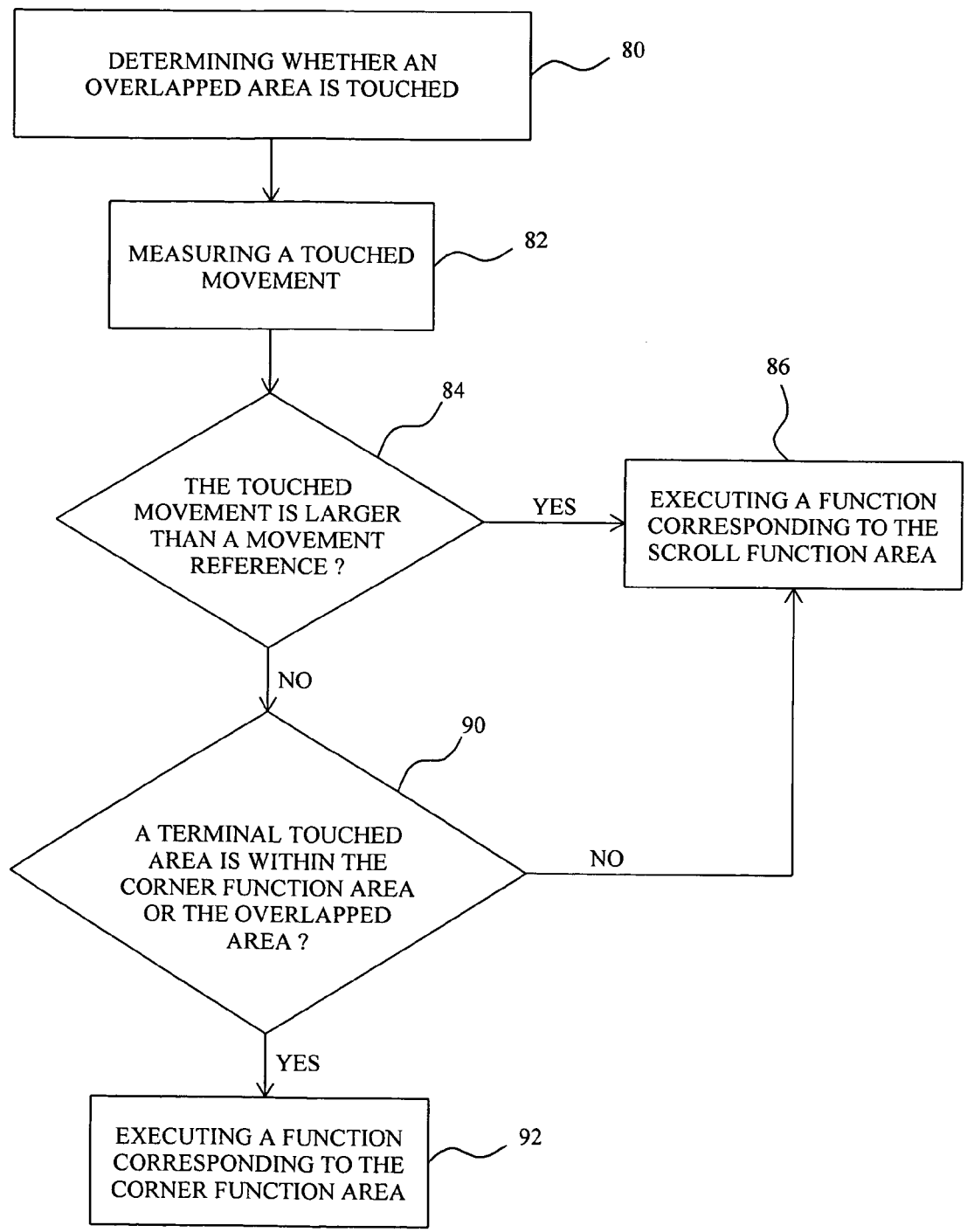
FIG. 9 is a flowchart of the fourth embodiment of the present invention.

FIG. 9 is diagram of the fourth embodiment of the present invention. First, step 80 determines whether an overlapped area is touched; wherein the overlapped area, for example, is referred to as the overlapped area 32 in FIG. 3, which is overlapped by the corner function area CR1 and the scroll function area SCROLL1. Step 82 follows and measures a touched movement. Step 84 then follows and determines whether the touched movement is larger than a movement reference. If the result of step 84 is true, step 86 follows and performs a function corresponding to the scroll function area SCROLL1; whereas, step 90 follows and determines whether a terminal touched area is within the corner function area CR1 or the overlapped area 32. If the result of step 90 is true, then step 92 follows and performs a function corresponding to the corner function area CR1; whereas, the process is returned to the step 86 and performs the function corresponding to the scroll function area SCROLL1.

As described in above embodiments, the overlapped area is overlapped by the corner function area and the scroll function area, however, the overlapped area also can be overlapped by other function areas when other embodiments is applied.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as string forth in the appended claims.

What is claimed is:

1. A method for detecting overlapped function area on a touchpad that has at least a main function area, a first function area, a second function area, and an overlapped area which defines a physical area where the first and second function areas overlap, the method comprising the steps of: determining whether the overlapped area is touched; and counting a touched duration on the overlapped area if the overlapped area is touched; wherein, if the touched duration is longer than a reference duration, a first function corresponding to the first function area is performed; otherwise a second function corresponding to the second function area is performed; wherein said second function is distinct from said first function; whereby the main function area is defined by an area not including the first, second and overlapped function areas.

* * * * *